Feb. 21, 1967 K. L. CRABTREE 3,305,437
SINGLE THICKNESS PULP PARTITION MOLDING METHOD AND APPARATUS
Filed June 4, 1964 4 Sheets-Sheet 2
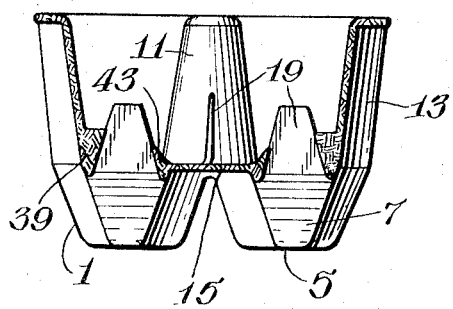
Fig.6.
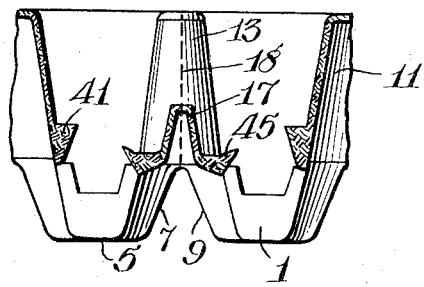
Fig.7.
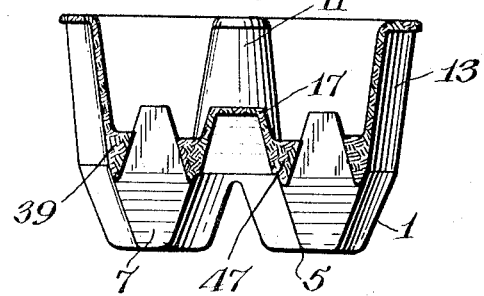
Fig.8.
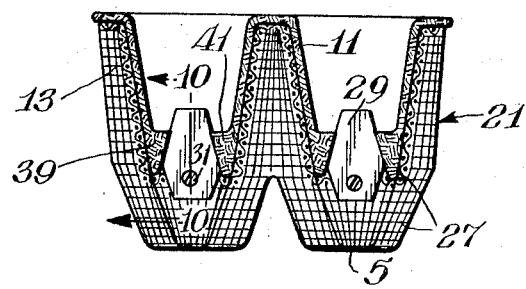
Fig.9.
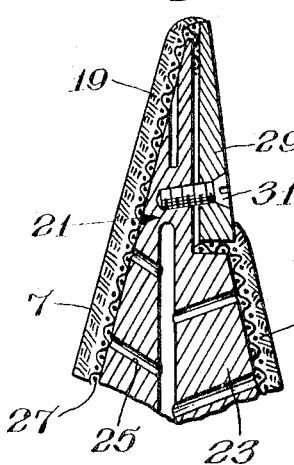
Fig.10.
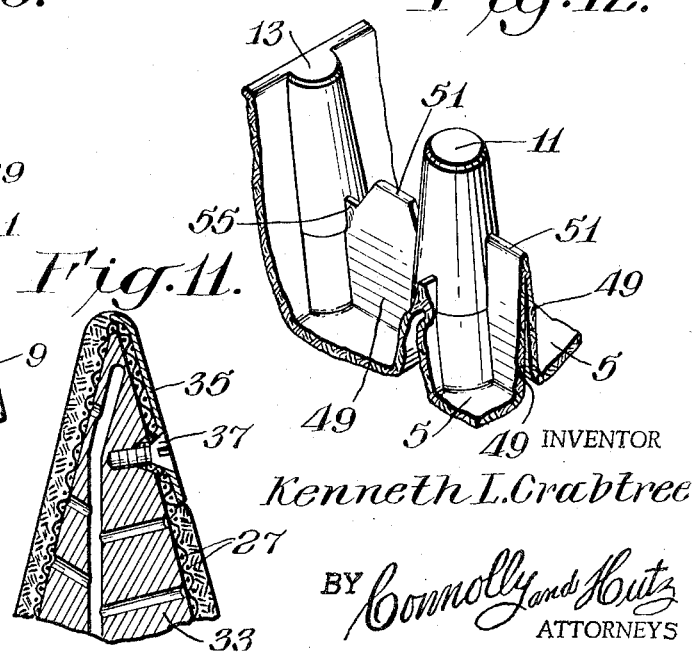
Fig.12.
Fig.11.
INVENTOR
Kenneth L. Crabtree
BY Connolly and Hutz
ATTORNEYS

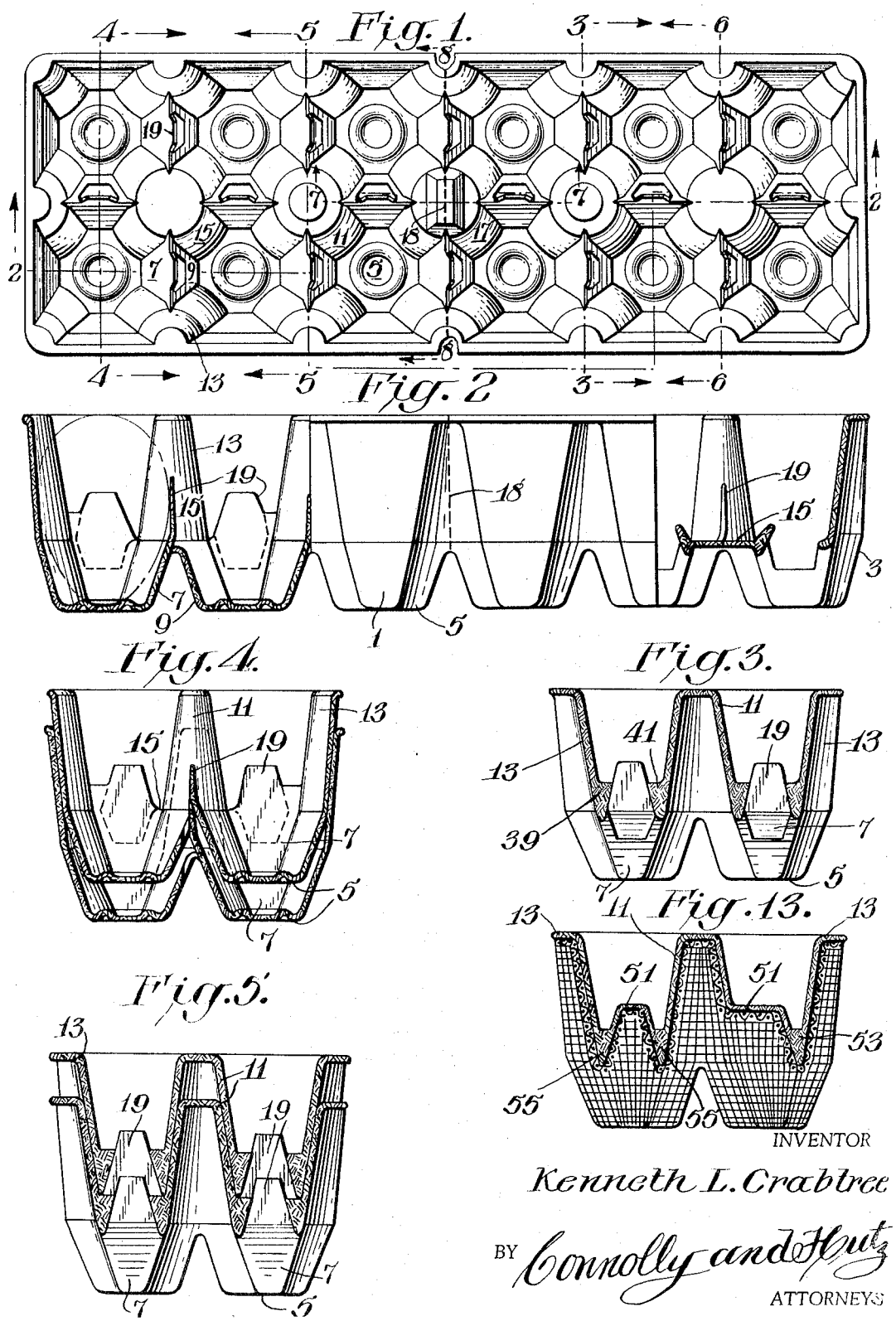

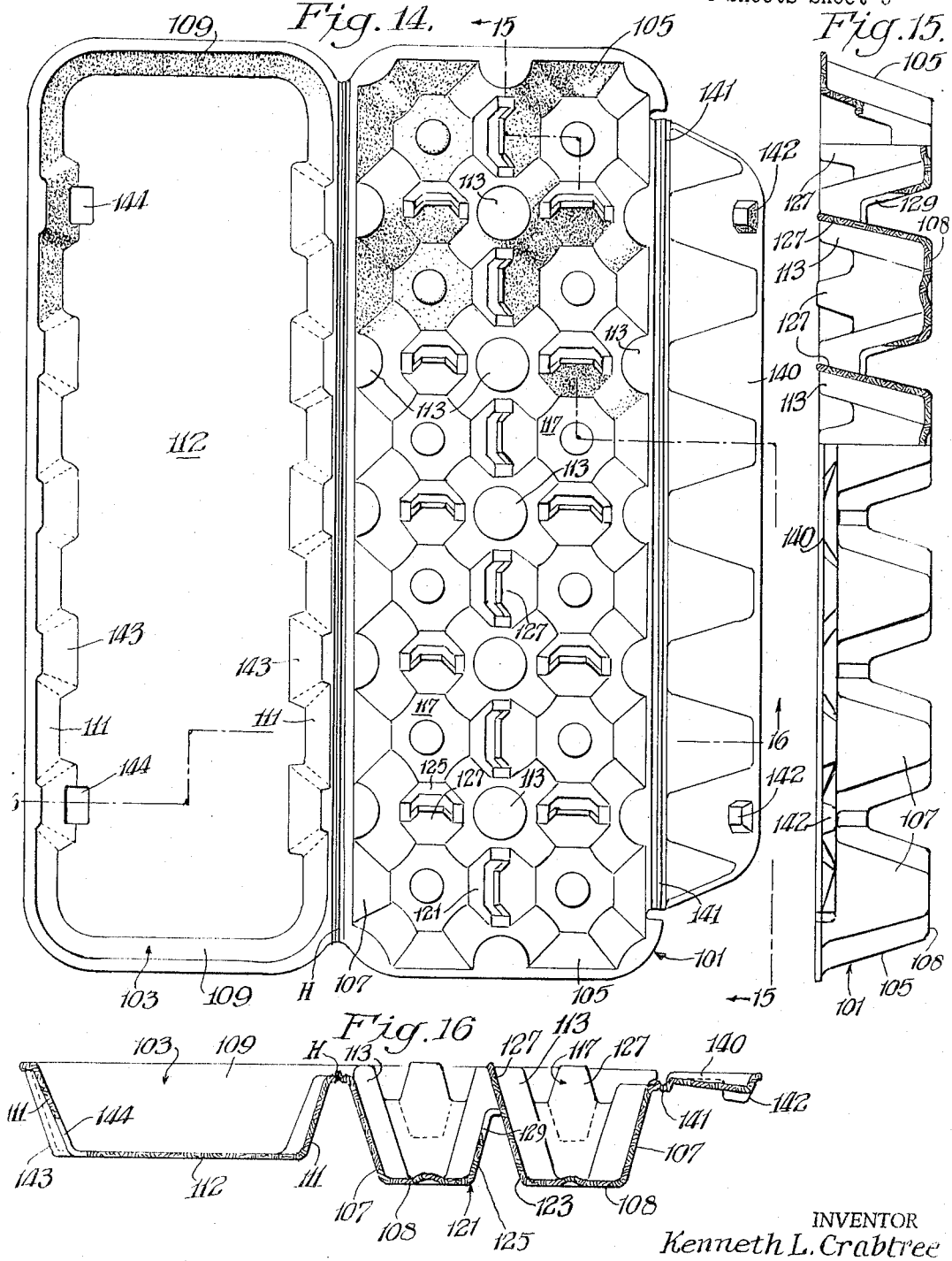

Feb. 21, 1967 K. L. CRABTREE 3,305,437
SINGLE THICKNESS PULP PARTITION MOLDING METHOD AND APPARATUS
Filed June 4, 1964 4 Sheets-Sheet 4
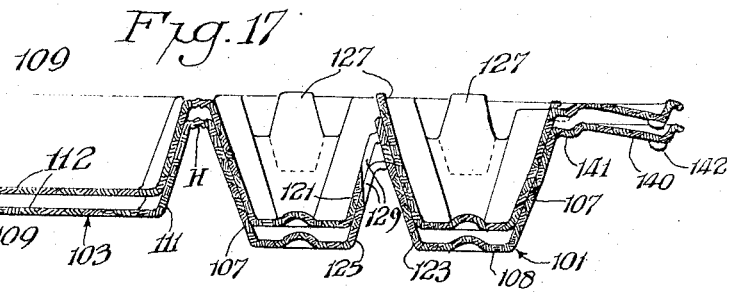
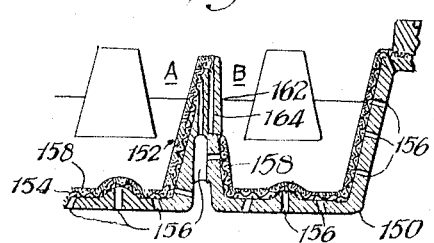
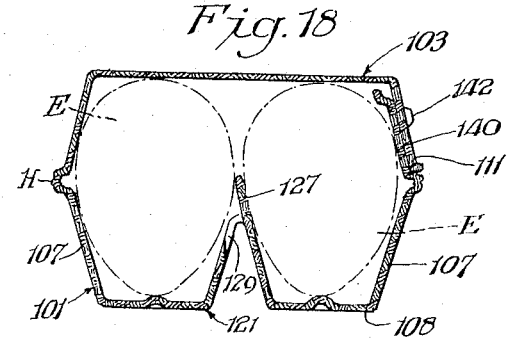
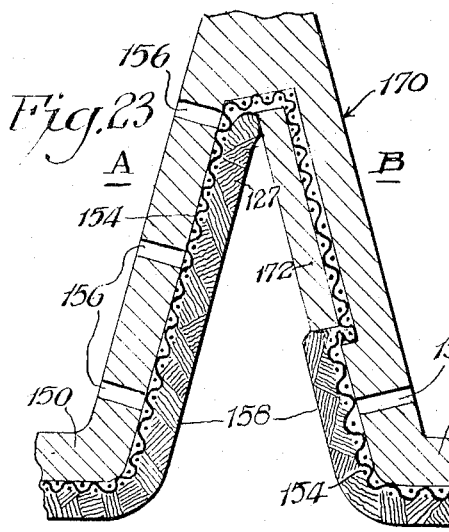
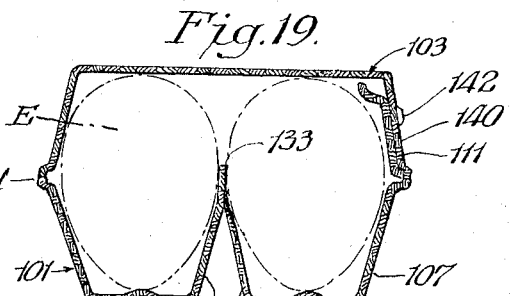
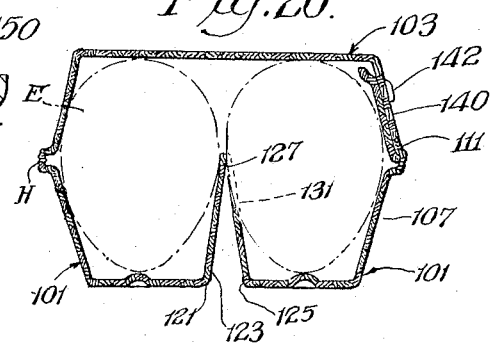
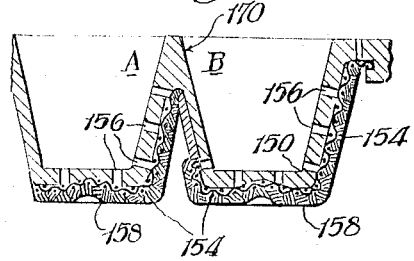
INVENTOR:
Kenneth L. Crabtree
BY Connolly and Hutz
ATTORNEYS

United States Patent Office 3,305,437
Patented Feb. 21, 1967

3,305,437
SINGLE THICKNESS PULP PARTITION MOLDING METHOD AND APPARATUS
Kenneth L. Crabtree, Fairfield, Maine, assignor to Keyes Fibre Company, Waterville, Maine, a corporation of Maine
Filed June 4, 1964, Ser. No. 374,878
13 Claims. (Cl. 162—218)

This is a continuation-in-part of application S.N. 285,755 filed June 5, 1963, and S.N. 834,759 filed August 19, 1959, both now abandoned.

The present invention relates to molding partition structure of pulp or other suitable synthetic plastic material, and more particularly to method and apparatus for molding single thickness upstanding wall structure useful for cushioning barriers as well as multiple thickness gusset formations useful for anti-jamming and strengthening features, separately and in combination. The resultant molded products are claimed in my Patent 3,243,096 granted March 29, 1966.

The single thickness upstanding wall structure of this invention, regardless of the method or apparatus employed to form such a product, provides a long-sought answer to the problem of properly cushioning articles, such as eggs in a pocketed container, against lateral forces with a minimum usage of material and space.

It is an object of the present invention to provide a method of directly molding such structure to attain the highly satisfactory cushioning with desirable economy which does not depend upon cutting, folding, after-pressing or the like to form the single thickness wall structure. Moreover, the method further may encompass multiple thickness gusset formations highly satisfactory for anti-jamming purposes, either alone or in combination with the single thickness partitions.

Another object of the present invention is to provide apparatus for directly molding such structure to attain the highly satisfactory cushioning with desirable economy which does not depend upon cutting, folding, after-pressing or the like to form the single thickness structure. Moreover, the apparatus further may provide multiple thickness gusset formations highly satisfactory for anti-jamming purposes, either alone or in combination with the single thickness partitions.

In the art of molding containers of pulp, synthetic plastics and other materials, it is generally not possible to mold wall structure in absolutely vertical planes, that is, in planes absolutely parallel with the direction of article-die separation, since it would be almost impossible to remove such an article from the forming die generally employed. It is therefore necessary to construct side walls of such articles with a greater or lesser degree of inclination to the direction of article-die separation, the extent thereof being at least partially determined by the vertical height of the wall in question, and ordinarily being on the order of 5° to 20° angle to the direction of article-die separation. This is particularly true of containers which include a plurality of cells adapted to support objects therein, the common wall structure of adjacent cells taking the form of ribs and comprising an upwardly extending and convergingly sloping pair of wall members, which may be connected to other rib or side walls such as posts at either end thereof. Examples of such containers include trays and cartons which are designed to support objects such as eggs, fruits, light bulbs and other articles therein.

The present invention includes method and apparatus for directly forming structures which defines improved cell wall structure, as well as the resultant as-molded product. This improved cell wall structure may be of unitary molded thickness and extends upwardly to a height which is adequate to prevent articles in adjacent cells from contacting one another across the top of the upwardly extending and convergingly sloping pair of cell wall members. This is a particularly important feature in trays or cartons of the type adapted to support a plurality of relatively fragile articles such as eggs, fruits, light bulbs, and other articles.

On shipping or storing pocketed containers of the above type, they are nested one within the other in order to save space. In the nested relationship, a large number of containers are stacked so that the interior of the pockets of each lower container snugly receive the exterior of the pockets of each next adjacent upper container while the interior of the posts of an upper container snugly enclose the exterior of the corresponding posts of the lower container. Absent the use of suitable means for preventing jamming or wedging together, it is virtually impossible to separate containers of the type in question without either distorting or tearing the same.

One of the novel features of the present invention is based on the discovery that it is possible to integrally mold gusset means which not only serve to structurally strengthen the containers in question but also serve to prevent jamming when stacking like containers one within the other. Each integrally molded gusset means extends downwardly and joins the upper regions of the ends of a pair of cell wall members to each other to provide structure of a vertical height of multiple thickness substantially greater than unitary molded thickness. By "unitary molded thickness" is meant the thickness of container structure attained by usual molding techniques. Such molding techniques include depositing cellulosic pulp from a slurry by generally uniform suction on a wire screen which is formed to represent either the interior or exterior shape of the desired articles.

The aforesaid gusset means, by virtue of a vertical (i.e. direction of article-die separation) height substantially greater than unitary molded thickness, serve to space the stacked containers a sufficient distance apart to avoid jamming while not appreciably increasing the overall stacking height of the containers. Additionally, these gusset means increase the strength of the containers of the present invention at critical points. This is a particularly important feature when the associated rib wall structure corresponds to the preferred embodiment of the present invention or is relatively high as compared to the overall height of the container since it counteracts bending forces which might otherwise tear the container in areas adjacent the upper regions of the rib structure.

It will be appreciated that the gusset means of the present invention is not only positioned in the container in such a manner that it avoids interference with article storage capacity but also affords the aforesaid means for preventing jamming as well as enhanced structural strength.

Another novel feature of the present invention is based on the discovery that the above discussed single thickness partitions and the above discussed multiple thickness gussets may be directly molded in companion fashion to provide a superior rib structure in a single molding operation which includes the benefits of both formations.

Other objects and advantages of the present invention will become apparent to one skilled in the art from a reading of the following description in conjunction with the accompanying drawings wherein similar reference characters refer to similar parts, and in which:

FIG. 1 is a top plan view of one embodiment of egg carton of the present invention;

FIG. 2 is a view taken along the line 2—2 of FIG. 1;

FIG. 3 is a view taken along the line 3—3 of FIG. 1;

FIG. 4 is a view of nested containers of the embodiment of FIG. 1 taken along the line 4—4 thereof;

FIG. 5 is a view of nested containers of the embodiment of FIG. 1 taken along the line 5—5 thereof;

FIG. 6 is a view taken along the line 6—6 of FIG. 1;

FIG. 7 is a view taken along the line 7—7 of FIG. 1;

FIG. 8 is a view taken along the line 8—8 of FIG. 1;

FIG. 9 is a cross-sectional view of a typical forming die used for forming the embodiment of FIG. 1 by suction deposition from an aqueous slurry of pulp;

FIG. 10 is an enlarged cross-sectional view taken along the line 10—10 of FIG. 9;

FIG. 11 is a view similar to FIG. 10 of a modified forming die;

FIG. 12 is a perspective view illustrating alternative embodiments of the present invention;

FIG. 13 is a cross-sectional view of a forming die used for forming the alternative embodiments of FIG. 12 by suction deposition of pulp from an aqueous slurry of pulp;

FIG. 14 is a top view of another type of egg carton;

FIG. 15 is a side view partially in section along line 15—15 of the carton of FIG. 14;

FIG. 16 is a cross-section of the carton of FIG. 14 along line 16—16;

FIG. 17 is a section similar to that of FIG. 16 of a plurality of cartons in nested arrangement;

FIG. 18 is a sectional detail along line 16—16 of the carton of FIG. 14 but with the cover thereof in closed position;

FIG. 19 is a sectional detail similar to that of FIG. 18 showing another embodiment of the carton;

FIG. 20 is a sectional detail similar to that of FIG. 18 of still another embodiment of the carton;

FIG. 21 is a schematic sectional detail showing a portion of the mold used in forming the carton;

FIG. 22 is a sectional detail of another embodiment of the mold used in forming the carton; and FIG. 23 is an enlarged sectional detail of a portion of the mold of FIG. 22.

With reference to the drawings, the embodiment of the container of the present invention as illustrated in FIGS. 1–8 will now be described in detail. As seen best in FIGS. 1 and 2 of the drawings, the container comprises side walls 1, end walls 3, and a bottom portion generally indicated by reference numeral 5. As seen in FIG. 2, there is shown the phantom outline of an egg packaged in one cell of the container, the side and end walls 1 and 3 thereof preferably being of such a height that they extend to at least the top end of an egg or any other similarly shaped article packaged therein.

This container is preferably formed of a material which is capable of being molded as a single unit, i.e., integrally molded. Although fiber pulp is particularly satisfactory for this purpose, other suitable materials may be used such as light, strong plastic which may be molded as a one-piece unit between mating male and female dies or in other conventional dies.

The container of FIG. 1 is divided into a plurality of cells, the structure between a pair of adjacent cells comprising an upwardly extending and convergingly sloping pair of cell wall members 7 and 9. Each pair of wall members is joined to the bottom wall 5 and is arranged in either a transverse or longitudinally extending direction. A plurality of spaced posts 11, 13, 15 and 17 extend upwardly from the bottom wall 5. Posts 11, as shown, are full posts of a height corresponding substantially to the height of side and end walls 1 and 3. Posts 13 are half-posts arranged along the side and end walls and extending upwardly to substantially the same height as these walls. Posts 15 are full posts of substantially reduced height, the longitudinally extending center row of posts preferably including an odd number of posts with the even numbered posts therein being of such reduced height to facilitate article removal. Post 17, also of reduced height and the central post of the longitudinally extending center row of posts is of special design for the purpose of permitting transverse division of the container into two halves along score line 18, the resulting halves of central post 17 being shaped to retain objects within adjacent cells in upright position.

As shown, cell wall members 7 and 9 extend between and connect adjacent post member pairs 11, 13; 11, 15; 11, 17; 13, 15 and 13, 17, to each other. However, and as those skilled in the art will appreciate from the following description, cell structure adequate for supporting various objects could be provided without the use of any diagonally arranged posts, i.e., the pairs of cell wall members 7, 9 may intercept one another in the absence of post structure 11, 15 and 17 and may intercept the side and end walls 1 and 3 in the absence of half-posts 13. Thus, FIG. 1 merely illustrates a preferred embodiment of the present invention since the container thereof may take many other forms while utilizing the important molded gusset means and associated cell wall structure of the present invention.

The structure of the pair of wall members 7 and 9, as illustrated by the embodiment of FIG. 1, includes an arrangement which is free of means interconnecting one wall to the other in the central portion of the length thereof. Preferably, wall member 7 is of a height substantially less than the theoretical point of merger of the upwardly extending and convergingly sloping walls 7 and 9 and wall member 9 is of a substantially greater height by virtue of a tabular extension element 19, extension element 19 preferably extending upwardly to a height sufficiently great to provide means preventing articles in adjacent cells from contacting each other.

A preferred means for forming tabular extension element 19 is shown in FIGS. 9 and 10 which illustrate a female mold for forming this structure as well as adjacent structure. The essential portion of the mold 21 of these figures includes a vertically extending base portion 23 which tapers upwardly to support the means used to form walls 7 and 9 and tabular extension 19. Base portion 23 includes ports 25 connected, in a well known manner, to a vacuum suction source for the purpose of applying suction to screening 27 arranged thereover and thereby deposit pulp fibers from an aqueous slurry. The unbridged central portion of the pair of walls 7 and 9 is formed by shielding or blanking off screening 27 with a solid member 29 fastened to base 23 via countersunk screw 31, the free ends of screening 27 adjacent member 29 being locked into position between members 23 and 29. In lieu of the arrangement of FIGS. 9 and 10, and as shown by FIG. 11, screening 27 may extend completely over a base element 33 and the desired portion thereof blanked off by means of a relatively thin nonforaminous element 35 which may be made of sheet metal or other suitable material. This element is held in position by a countersunk screw member 37. Further, as is obvious from a brief inspection of FIG. 11, other suitable materials for the relatively thin non-foraminous element include waterproof paint, sealing compound and solder applied directly to the screening 27 to blank it off and thus prevent suction deposition of pulp in the desired zone. Such material would adhere to the screening and would not need to be held in position by means such as the countersunk screw 37.

Elements 29 and 35 determine the size and shape of the opening defining the unbridged portion of the pair of wall members 7 and 9. Preferably this shape is such that it permits entry of a tab portion 19 into the overlying opening of another like container placed above in stacked relation. FIGURE 4 well illustrates such an opening arrangement which permits stacking irrespective of the vertical height of tab 19.

With continued reference to the embodiment of FIG. 1, the gusset means of the present invention may take many different forms as is illustrated best in FIGS. 3 and 6–8 inclusive by reference numerals 39, 41, 43, 45 and 47.

Each of these integrally molded gusset means extend downwardly and join the uper regions of the ends of one pair of side wall members 7 and 9 to each other at, in the preferred embodiment, one of the post connecting ends thereof to provide structure of a vertical height substantially greater than unitary molded thickness. As will be appreciated when considering FIGS. 4 and 5, such gusset means, in view of its vertical height of substantially greater than unitary molded thickness, is useful in preventing jamming when stacking like containers one within the other. Thus, the walls, posts and other vertically extending structure of the container which would normally fit snugly within one another are spaced apart and as a result there are no substantial frictional forces which must be overcome when separating stacked containers. Furthermore, such gusset means serve to increase the structural strength of the present containers at critical areas thereof without interfering with their storage capacity.

The gusset means of the present invention may be formed by a variety of methods. The preferred method for use in the art of molding pulp by suction deposition on a wire or other screening depends on the discovery that there is a tendency for pulp fibers to agglomerate in interfelted fashion across a relatively narrow gap between wire formation members defining the sides of two rather steeply rising adjacent elements of a molded article. Thus, and with further reference to FIG. 9, gusset means 39 and 41 are formed in the narrow slots represented by their cross-sectional areas and extending between the screening 27 used to form wall members 7 and 9 and the adjacent screening used to form adjacent half-post 13 and full post 11. Gusset means 43, 45 and 47 are formed in similar fashion. In general, the vertical height of the gusset means which may be obtained by this method of formation depends on the relative angular divergence of the two upwardly and outwardly extending members which define the slot which is filled by the pulp fibers. Employing typical aqueous slurry make-ups, customary meshes for screening and the usual degree of vacuum suction, it is possible to obtain solid gusset means having an upper horizontal dimension of up to the order of ⅜ of an inch or more.

Although a preferred embodiment of the present invention has included tabular extension 29 for the purpose of affording a molded thickness barrier of single molded thickness between articles packaged in adjacent cells, an equally effective cell wall structure for certain purposes is illustrated in FIG. 12. A typical mold for forming the structure of FIG. 12 is shown in FIG. 13. Each of the wall members 49, 49 of FIG. 12 are integrally joined at their tops by ridge bridging means 51 of substantially unitary molded thickness. As shown to the right of post 11 (FIGS. 12 and 13), no gusset means is associated with the point of merger of bridging means 51 and post 11. However, gusset means 53 is associated with the half-post 13 (right-hand side of FIG. 13). With reference to the left-hand side of FIGS. 12 and 13, gusset means 55 are provided on either side of bridging means 50. It is believed apparent from FIGS. 12 and 13 that the difference in the mold herein used and that used in the formation of the gusset means of the embodiment of FIG. 1 is the omission of blank-off element 35 of FIG. 11. Additionally, it will be appreciated for reasons explained above in connection with the embodiment of FIG. 1, that post structure 11 could be omitted. Similarly, plain side wall structure could be substituted for half-posts 13. Furthermore, other forms of post structure such as 15 and 17 could be used in lieu of post 11.

Although the description of the method employed for producing the various embodiments of the present invention has been limited to molding articles from fiber pulp, it will be appreciated that the same structure may be obtained from plastics and other suitable materials by the use of suitably shaped dies. Thus, tabular extensions 29 of the walls 7 and 9 could be formed of plastic by the use of mating male and female dies which come completely together in the areas which are unbridged and define the opening shape adjacent tabular extension 29. Similarly, gusset formation could be obtained between these same molds by providing an inter-connected cavity spacing adequate to receive sufficient plastic material to provide the desired formation.

Although the above described embodiments refer to a relatively high side wall container which may be used in connection with sleeve cover means such as shown in Patent 3,129,866 granted April 21, 1964, or other cover means such as described in my Patent 3,193,177 granted July 6, 1965, it will be equally apparent that the gusset means and associated improved cell wall structure are equally useful in other forms of containers such as that illustrated by the following embodiments. Furthermore, a variety of different shaped pockets and posts in trays may incorporate the gusset means and/or improved cell wall structure of the present invention.

Referring now more particularly to FIGS. 14 through 16 and 18, another egg carton will be described in detail.

As seen in FIG. 14, the carton comprises a body section generally designated by reference numeral 101 and a top cover section generally designated by reference numeral 103. The body section 101 has end walls 105, side walls 107 and a bottom 108 while the top section 103 has end walls 109, side walls 111 and a top panel 112. The top section 103 is hinged to the body section 101 through hinge H.

As further seen in FIG. 14, the body section 101 has article or egg supporting units 113 which extend upwardly from the bottom 108. The egg supporting units 113 may assume many shapes or forms. For the sake of convenience and to show one preferred form of the invention these units will be described as posts and will hereinafter be referred to as posts 113. The posts 113 extend lengthwise of the body section 101 in spaced apart substantially straight lines preferably in three longitudinally extending lines with one line extending substantially along the longitudinal center line of the body section 101 and with the other two lines extending along and immediately adjacent the side walls 107 of the body section 101. The posts extending along the longitudinal center line of the body section 101 except for the endmost posts comprise inwardly projected portions of the bottom 108 and have the shape of truncated cones. The endmost posts 113 which lie immediately adjacent the end walls 105 and those posts lying adjacent and extending along the side walls 107 have the shape of vertically split-in-half truncated cones with the curved portion of the posts 113 facing the interior of the body section 101. These endmost posts 113 and those posts lying adjacent and extending along the side walls 107 comprise inwardly projected portions of the end walls 105 and side walls 107.

As further seen in FIG. 14, the spaced apart posts 113 also lie in substantially straight lines in a direction extending transversely of the body section 101. With this arrangement, every two adjacent posts 113 along the longitudinal center line of the body section 101 cooperate with each opposite and adjacent pair of posts in each line of posts extending along the side walls 107 of the body section 101 to form an egg receiving pocket generally designated by reference numeral 117 for supporting an egg.

The cushioning barrier feature of the invention will now be described. As seen in FIG. 14, a raised rib 121 initiating with and comprising an upwardly projected portion of the bottom 108 connects each post 113 cooperating to form an egg receiving pocket 117. As better seen in FIGS. 16 and 18, of the drawing, the ribs 121 comprise upwardly extending double side walled projections with the side walls identified as 123 and 125. A cushioning tab 127 extends upwardly from the rib 121 forming an integral extension of the wall 123. The tab 127 occupies that area between adjacent eggs which is normally free of egg occupancy and does not affect the position of the eggs when packaged in the carton. In other words, a single thickness of pulp is provided between adjacent eggs at the point of greatest diameter of the eggs to prevent possible contact between and thereby prevent checking of adjacent eggs when the carton is jolted or otherwise disturbed.

The cushioning tab 127 may be formed during the molding operation with the use of a special type molding device which will be explained in detail hereinafter. With the use of this special type molding device, an opening 129 along the upper portion of side wall 125 of the rib 121 is also formed whereby the tab 127 comprises an extension of the side wall 123 of the rib 121.

FIG. 17 shows the empty cartons of FIGS. 14–16 in nested or stacked relationship. As seen in this figure, the cartons may readily and easily be stored in this position.

FIG. 18 shows the packaged eggs E in relationship with the cushioning tabs 127.

FIG. 19 shows a further embodiment of the rib 121 and cushioning barrier 127 wherein the rib 121 extends to a height at least corresponding to the point of greatest diameter of the eggs but which has a compacted or pressed together portion 133 along the middle of the top ridge of the rib 121 which portion cradles the eggs E and provides, in effect, a uniform or single thickness of pulp between adjacent eggs at their probable or possible checking area, as more particularly disclosed in my Patent 3,243,095 granted March 29, 1966.

FIG. 20 shows an embodiment of the rib 121 and cushioning tab 127 wherein the double wall structure of the rib 121 at least extends up to the point of greatest diameter of the adjacent eggs E but wherein the central portion of wall 125 has a cut out curved slot to provide an opening 131 which cradles the egg E so that, in effect, a single wall thickness of pulp is provided between the eggs at their possible checking areas.

As shown in FIGS. 14, 16 and 17, the body section 101 has an elongated ledge 140 which is hinged by pulp hinge 141 to front side wall 107 of the bottom section 101. The ledge 140 includes fastener elements 142 which fit through slots 144 extending through the sides of two of the stiffening elements 143 extending along the non-hinged side wall 111 of the cover section 103.

The stiffening elements 143 supplement and lie in vertical alignment with the posts 113 when the top section 103 is folded over in closed position atop the bottom section 101.

The half posts 113 which extend along the front side wall 107 of the body section 101 do not extend upwardly to the height of the posts in the remaining portion of the body section 101. This arrangement accommodates the free end of non-hinged side wall 111 of top covering 103 as well as ledge 140 when each are folded into locked position as shown, for example, in FIG. 18.

The molds for producing the molded carton will now be described.

As illustrated by FIG. 21, a female mold for forming the body section 101 comprises a base portion 150, and vertically extending and spaced apart units supported by the base portion for forming the egg supporting units such as the posts 113 within the carton. The vertically extending units for molding the posts are not shown in the drawing since these are well understood by those skilled in the art. The mold 150 further comprises a vertically extending walled projection or rib 152 which tapers inwardly as it extends upwardly from the base portion 150 and which forms the rib 121 and cushioning tab 127. As seen in FIG. 21, an open mesh screening 154 is positioned over and lies adjacent the upper side of the base portion 150 of the mold. In addition, the open mesh screening 154 extends completely over and lies against the A wall or side of the upwardly extending projection 152. On the B wall side of the projection 152, the screening 154 extends over and against only the lower portion thereof. Extending completely through the base portion 150 in spaced apart manner are vacuum passages 156 through which a vacuum is applied in order to draw pulp 158 against the screened portions. As seen in FIG. 21, these vacuum passages 156 lead to the screen portion only and not to the unscreened area along the upper face of the B wall or side of the projection 152.

Conveniently, a screen clamp 162 is provided which is tapered so that it forms a continuous uninterrupted extension of the B wall or side of the projection 152. The clamp 162 fits into a cut-out area 164 along the upper portion of the B wall or side of the projection 152 to clamp the ends of the screening 154 extending from the A side of the projection and the lower face of the B side of the projection 152 firmly in position. To fix the clamp 162 in position, a threading screw may extend through the clamp 162 and into the body of the projection 152, essentially as illustrated in more detail in FIG. 10.

With the above described arrangement the pulp will adhere to all of the screened area but will not adhere to the unscreened area along the upper face of the B side of the projection 152. The construction of the cartons shown in FIGS. 16 and 18 is therefore formed with only a single thickness cushioning tab 127 at the point of the greatest diameter of adjacent eggs.

FIGS. 22 and 23 show a male embodiment of the mold. In this mold, the screening 154 is positioned completely along the underside of the base portion 150 as well as completely and continuously along the underside of a double walled projection 170 for forming the cushioning tab 127. With this arrangement, vacuum is also applied through passages 156 to draw the pulp 158 against the screening 154. There are no vacuum passages extending along the upper portion of the inner face of the B wall or side of the double walled projection 170, the screening at this point being blocked off as at 172 to provide assurance that pulp will not adhere along the upper portion of the inner face of the B side or wall of the projection 170 whereby a cushioning tab 127 of single thickness as shown in FIGS. 16 and 18 will be formed along the upper portion of the inner surface of the A side or wall of the projection 170.

With the above described mold, a new and novel type egg carton of regulation size may be formed wherein a protective cushioning tab 127 is provided between the point of greatest diameter of adjacent eggs.

Thus, method and apparatus have been disclosed for forming single thickness upstanding partition structure which extends upwardly from the converging upper limits of transverse, double walled rib structure. Additionally, method and apparatus have been disclosed for forming thickened, gusset-like formations at the zone where a pair of convergingly sloping transverse rib walls join with a closely spaced side wall which extends higher than the rib structure. While it is possible to form the upstanding partition or extension structure exclusively, and it is also possible to form the multiple thickness gusset structure exclusively, it has been found convenient in many molded pulp articles such as egg trays to form both such structures contemporaneously. When the upstanding partition structure such as illustrated at 127 in the egg tray illustrated in FIGS. 14–18 occupies the mid-portion of the double walled rib structure, the spacing between the lateral extremities of the partition structure and the adjacent post or side wall structure determines the thickness of the gusset-like formation. For instance, in the FIGS. 14–18 tray, the spacing is illustrated as having an extent which would inherently produce slightly thickened formations where the pair of convergingly sloping rib walls join adjacent the lower lateral margins of the single thickness upstanding structure. However, depending upon the length of time the dies are immersed in the fibrous pulp slurry, upon the quality of the slurry, upon the amount of suction applied, and the like, thickened formations may be essentially avoided with dimensions as illustrated in FIGS. 14–18. Clearly, when the dimensions are such as illustrated in the egg carton of FIGS. 1–8, the thickening at the areas 39 will be substantial. An example of a commercial carton utilizing both the tab and the gusset features of the present invention is illustrated in FIGS. 8–18 of Patent 3,215,327, granted November 2, 1965. Thus, it is apparent that the quality and quantity of gusset formations may be controlled depending upon the results desired.

Additionally, the boundaries or margins of the upstanding single thickness partition sheet are generally defined by ragged, feathered edge fibrous pulp when produced according to the above described methods and by using the above described apparatus. This is in direct and easily discernible contrast to smoother edges across the thickness of molded pulp sheets established by forming dies, cutting or other such operations. Accordingly, it is advisable to further include a water spray in the general area of the anti-forming zone of the rib wall on which the aperture or opening is to be formed after removal of the die from the slurry. This minimizes ragged edges caused by stray fibers since the water spray causes the stray fibers to flow toward and attach themselves to the pulp layer as the suction draws the water through the pulp.

Obviously many modifications and variations of the present invention are possible in the light of the above teachings. It is, therefore, to be understood that within the scope of the appended claims the invention may be practiced otherwise than as specifically described.

What is claimed is:

1. Apparatus for molding pulp articles comprising an open-face forming die having a direction of article-die separation, the die including a pair of convergingly sloping wall portions the mid-portions of which converge in a relatively sharp peak, the mid-portion of one of the pair of wall portions in a zone adjacent the peak where the pair of wall portions converge being angled to the direction of article-die separation at a small angle less than about ten degrees and the mid-portion of the other wall portion in a zone adjacent the peak where the pair of wall portions converge being angled to the direction of article-die separation at a small permissible draft angle greater than about five degrees but less than about twenty degrees and having a substantially planar configuration, and means providing a porous suction surface over the die except in the zone adjacent the peak on the mid-portion of the one wall.

2. Apparatus for molding pulp articles comprising an open-face suction die having a direction of article-die separation, the die including a base portion extending generally transverse to the direction of article-die separation, a pair of opposed side wall portions connected with opposite sides of the base portion and extending upwardly and outwardly therefrom at acute angles to the direction of article-die separation, a transverse partition portion extending across the base portion and including a first and a second rib wall portion each connected between the pair of opposed side wall portions, the rib wall portions also extending upwardly from the base portion and being convergingly acutely angled to the direction of article-die separation and being joined together across their upper portions, an upwardly directed extension forming member formed between and spaced from the side wall portions to extend substantially above the joined upper portions of the rib wall portions, the extension forming member including a first wall portion connected in generally continuous fashion with the first rib wall portion and a second wall portion connected in generally continuous fashion with the second rib wall portion, the second wall portion of the extension forming member including means preventing the suction deposition of pulp thereon.

3. Apparatus for molding pulp articles as in claim 2 wherein the space between one side wall portion and the extension forming member where it connects with the partition portion is sufficiently small that a thickened gusset-like accumulation of pulp will build up in such space where the rib wall portions join.

4. Apparatus for molding pulp articles comprising an open-face suction die having a direction of article-die separation, the die including a base portion extending generally transverse to the direction of article-die separation, a pair of opposed side wall portions extending upwardly and outwardly from the base portion at acute angles to the direction of article-die separation, a transverse partition portion including a first and a second rib wall portion each connected between the pair of opposed side wall portions, the rib wall portions also extending upwardly from the base portion and being convergingly acutely angled to the direction of article-die separation and being joined together across their upper portions, the space between the side wall portions where they connect with the partition portion being sufficiently small that a thickened gusset-like accumulation of pulp will build up in such space where the rib wall portions join.

5. Apparatus for molded pulp articles comprising an open-face, screen covered suction die having a plurality of downwardly contoured depression portions arranged in a row for forming a row of pockets in the molded article, a series of substantially parallel upwardly contoured partition portions arranged generally transverse to the direction of the row for forming ribs separating adjacent pockets from each other in the molded article, a relatively sharp upwardly extending peak portion associated with each partition portion, the sides of the peak portions merging smoothly in continuous fashion with the partition portions, and means on one side of the peak portion for preventing suction deposition of pulp thereon for forming in the molded article a single thickness extension element to more effectively separate adjacent pockets from each other.

6. Apparatus for molding pulp articles as in claim 5 further including a pair of narrow, substantially U shaped downwardly extending notches extending across each partition portion in general alignment with the direction of the row, one at each edge of each peak portion for forming in the molded article a pair of gusset-like accumulations of pulp on each pocket separating rib, one at each edge of the extension element.

7. Apparatus for molding pulp articles as in claim 6 wherein the means for preventing suction deposition of pulp on the one side of the relatively sharp peak portion includes a non-porous blocking element secured thereto.

8. Apparatus for molding pulp articles comprising an open-face, screen covered suction die having a plurality of concavely contoured depression portions arranged in a row for forming a row of pockets in the molded article, a series of substantially parallel convexly contoured partition portions arranged generally transverse to the direction of the row for forming ribs separating adjacent pockets from each other in the molded article, and a series of narrow, substantially U shaped concave notches extending across the partition portions in general alignment with the direction of the row for forming in the molded article thickened gusset-like accumulations of pulp in the spaces provided by the notches.

9. Apparatus for molding pulp articles as in claim 8 wherein one edge wall of each narrow, substantially U shaped concave notch merges with the depression portions along one side of the row thereof to form a continuous, inwardly and outwardly curved wall defining one side of the molded article.

10. Apparatus for molding pulp articles as in claim 9 wherein the other edge wall of each narrow, substantially U shaped concave notch merges with one edge of a relatively sharp convex peak portion the sides of which merge smoothly in continuous fashion with the partition portions and one side of which includes means preventing the suction deposition of pulp thereon for forming in the molded article a single thickness extension element to more effectively separate adjacent pockets from each other.

11. Apparatus for molding pulp articles as in claim 10 wherein the other edge of each sharp, convex peak portion merges with one edge wall of another series of narrow, substantially U shaped concave notches also extending across the partition portions in generally parallel alignment with the aforesaid series of notches for forming in the molded article a second gusset-like accumulation of pulp on each pocket separating rib, one at each edge of the extension element.

12. Apparatus for molding pulp articles as in claim 10 wherein the means preventing suction deposition of pulp on the one side of the relatively sharp peak portion includes a non-porous blocking element secured thereto.

13. A method of forming single thickness partition structure to increase the height of double walled rib structure in molded pulp articles comprising the steps of providing an open-face forming die having a pair of convergingly sloping wall portions the mid-portions of which converge in a relatively sharp peak, shielding the mid-portion of one of the pair of sloping wall portions in a zone adjacent the peak where the pair of wall portions converge to preclude the deposition of pulp fibers in such zone, immersing the die in a fluid supply of fibrous pulp slurry, applying vacuum to the die to selectively deposit a coating of pulp fibers thereon in predetermined zones while precluding the deposition of pulp fibers on the mid-portion of one of the pair of sloping wall portions in a zone adjacent the peak where the pair of wall portions converge, removing the die from the fluid supply of fibrous pulp slurry, and then separating the coating of pulp fibers from the open-face forming die.

References Cited by the Examiner

UNITED STATES PATENTS

| | | | |
|---|---|---|---|
| 1,919,028 | 7/1933 | Koppelman | 229—29 |
| 1,922,145 | 8/1933 | Troyk | 229—29 |
| 2,515,113 | 7/1950 | Chaplin | 162—223 |
| 2,738,914 | 3/1956 | Hatch | 229—2.5 |
| 2,808,976 | 10/1957 | Chaplin | 229—2.5 |
| 2,997,196 | 8/1961 | Emery | 217—26.5 |
| 3,120,901 | 2/1964 | Boyd | 217—26.5 |
| 3,166,467 | 1/1965 | Reifers et al. | 162—223 |

DONALL H. SYLVESTER, *Primary Examiner.*

GEORGE O. RALSTON, J. H. NEWSOME,
*Assistant Examiners.*